US011234308B2

(12) United States Patent
Bao et al.

(10) Patent No.: US 11,234,308 B2

(45) Date of Patent: Jan. 25, 2022

(54) DIMMING CONTROL METHOD

(71) Applicant: Delta Electronics (Shanghai) Co., Ltd., Shanghai (CN)

(72) Inventors: Yugang Bao, Shanghai (CN); Xinghua Zhang, Shanghai (CN); Xiaoping Fu, Shanghai (CN)

(73) Assignee: Delta Electronics (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 17/322,935

(22) Filed: May 18, 2021

(65) Prior Publication Data

US 2021/0378069 A1 Dec. 2, 2021

(30) Foreign Application Priority Data

May 26, 2020 (CN) ........................ 202010455009.7

(51) Int. Cl.

*H05B 45/375* (2020.01)

*H05B 45/10* (2020.01)

(52) U.S. Cl.

CPC .......... *H05B 45/375* (2020.01); *H05B 45/10* (2020.01)

(58) Field of Classification Search

CPC ............................ H05B 45/375; H05B 45/10

See application file for complete search history.

(56) References Cited

U.S. PATENT DOCUMENTS

2014/0265880 A1* 9/2014 Taipale .................. H05B 45/12 315/158

2017/0325304 A1* 11/2017 Fu ......................... H02M 3/156

2019/0098716 A1* 3/2019 DeJonge ............ H05B 45/3725

FOREIGN PATENT DOCUMENTS

CN 104106314 B 7/2015

CN 107347222 B 2/2019

* cited by examiner

*Primary Examiner* — Minh D A

(74) *Attorney, Agent, or Firm* — CKC & Partners Co., LLC

(57) ABSTRACT

A dimming control method and a dimming circuit are used to control the brightness of a LED. The dimming circuit includes a power conversion unit having an input end, an output end, an inductor, and a switch. When the dimming current signal is higher than or equal to a first current threshold, the switch is controlled such that the power conversion unit operates in a continuous Conduction mode or a boundary Conduction mode; when the dimming current signal is lower than the first current threshold, the switch is controlled such that the power conversion unit operates in a discontinuous Conduction mode; and when the dimming current signal is lower than a second current threshold, the switch is controlled such that the power conversion unit operates in a chopping control mode.

19 Claims, 22 Drawing Sheets

DIMMING CONTROL METHOD

CROSS-REFERENCE TO RELATED APPLICATIONS

This non-provisional application claims priority under 35 U.S.C. § 119(a) on Patent Application No. 202010455009.7 filed in P.R. China on May 26, 2020, the entire contents of which are hereby incorporated by reference.

Some references, if any, which may include patents, patent applications and various publications, may be cited and discussed in the description of this invention. The citation and/or discussion of such references, if any, is provided merely to clarify the description of the present invention and is not an admission that any such reference is "Prior Art" to the present invention described herein. All references listed, cited and/or discussed in this specification are incorporated herein by reference in their entireties and to the same extent as if each reference was individually incorporated by reference.

BACKGROUND OF THE INVENTION

1. Field of the Invention

The invention relates to the field of lighting, and particularly to a dimming control method.

2. Related Art

Intelligent lighting has become the key point of the development of future industries. More and more intelligent lighting is controlled by digital control. Digitization enables LED lighting products to be miniaturized and integrated. Moreover, digital control has the following advantages: (1) easy to realize stepless dimming and color temperature control, (1) digital control is more flexible and applicable, and can enjoy high performance with low cost. Since light can produce a special visual effect on people which can adjust people's circadian rhythm, more and more lighting products are aiming at creating comfortable scene lighting, and providing more interactive experience and enjoyment to users. To redefining life with light and improve people's quality of life, a higher requirement is proposed for lighting control.

In applications with a higher requirement of lighting so that dimming and color modulation are needed, multiple channels of LED with different colors are often required for deep dimming and color control, so every channel of LED needs dimming with a wider range and a higher accuracy, such as, between 0.1% and 100%, or even between 0.01% and 100%. In such a way, a conventional dimming driving circuit cannot meet the requirement, and a LED dimming driving circuit having a higher accuracy shall be developed.

Based on digital lighting, the present applicant has proposed a LED driving circuit and a control method thereof (publication No.: CN 107347222 B) having a high accuracy dimming function. In order to avoid the problem of insufficient dimming accuracy caused by the direct sampling of the output current, the control method calculates the turn-on time by detecting the input and output voltages, and controls the LED driver to work in discontinuous conduction mode or chopping mode. High-precision dimming can be achieved. Since the LED driving circuit is only operated in the DCM mode and the chopping mode, the solution applies to limited situations with a high output voltage and a low output current. Moreover, over-current protection of the circuit can be realized only by adding additional circuits, which results in a complicated structure and increased costs of the circuit.

SUMMARY OF THE INVENTION

An object of the invention is to provide a dimming control method, which can expand a dimming range greatly and realize over-current protection conveniently while ensuring a high dimming accuracy by controlling a LED driving power to operate in different modes according to the output current.

To realize the above object, the invention provides a dimming control method applied to a dimming circuit for controlling the brightness of a light emitting diode. The dimming circuit includes a power conversion unit having an input end, an output end, an inductor, and a switch. The power conversion unit receives an input voltage from the input end, and converts the input voltage into an output voltage output from the output end by operation of the switch. Wherein the dimming control method includes:

generating an input voltage sampling signal by detecting the input voltage of the power conversion unit;

generating an output voltage sampling signal by detecting the output voltage of the power conversion unit;

generating a current sampling signal by detecting a current flowing through the switch in the power conversion unit;

receiving a dimming signal to calculate and generate a dimming current signal; and outputting a control signal to a driving circuit to drive and control the switch to turn on or turn off according to the input voltage sampling signal, the output voltage sampling signal, the current sampling signal, and the dimming current signal; wherein,

- the dimming current signal is compared with a first current threshold and a second current threshold,
- when the dimming current signal is higher than or equal to the first current threshold, the switch is controlled such that the power conversion unit operates in a continuous conduction mode or a boundary conduction mode;
- when the dimming current signal is lower than the first current threshold, the switch is controlled such that the power conversion unit operates in a discontinuous conduction mode, wherein when the dimming current signal is lower than the second current threshold, the switch is controlled such that the power conversion unit operates in a chopping control mode.

The additional aspects and advantages of the invention are partially explained in the below description, and partially becoming apparent from the description, or can be obtained through the practice of the invention.

BRIEF DESCRIPTION OF THE DRAWINGS

The exemplary embodiments will be described in detail with reference to the accompanying drawings, through which the above and other features and advantages of the disclosure will become more apparent.

DETAILED EMBODIMENTS OF THE INVENTION

Figure 1:
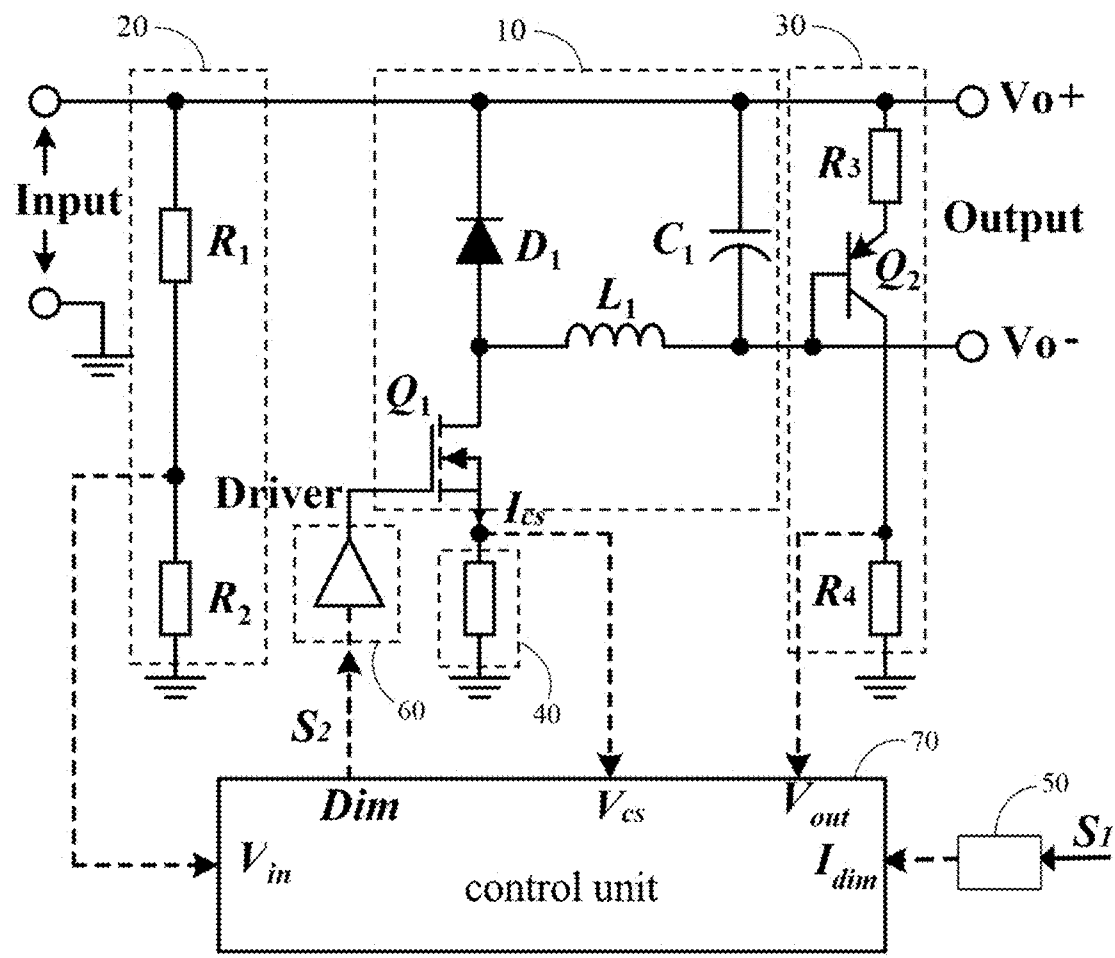
FIG. 1 is a block diagram illustrating a dimming circuit according to a first embodiment of the invention.

The exemplary embodiments will now be described more fully with reference to the accompanying drawings. However, the exemplary embodiments can be implemented in various forms and shall not be understood as being limited to the embodiments set forth herein; on the contrary, these embodiments are provided so that this invention will be thorough and complete, and the conception of exemplary embodiments will be fully conveyed to those skilled in the art. In the drawings, the same reference sign denotes the same or similar structure, so their detailed description will be omitted.

When factors/components/the like described and/or illustrated here are introduced, the phrases "one", "a(an)", "the", "said" and "at least one" refer to one or more factors/components/the like. The terms "include", "comprise" and "have" refer to an open and included meaning, and refer to additional factors/components/the like, in addition to the listed factors/components/the like. The embodiments may use relative phrases, such as, "upper" or "lower" to describe a relative relation of one signed component over another component. It shall be understood that if the signed device reverses to turn upside down, the described component on an "upper" side will become a component on a "lower" side. In addition, the terms "first", "second" and the like in the claims are only used as signs, instead of numeral limitations to objects.

FIG. 1 is a block diagram illustrating a dimming circuit according to a first embodiment of the invention. As shown in FIG. 1, the dimming circuit of the invention is configured to control the brightness of a light-emitting element (not shown) such as a light emitting diode (LED) or light emitting diodes (LEDs). The dimming circuit comprises a power conversion unit 10, an input voltage sampling circuit 20, an output voltage sampling circuit 30, a current sampling circuit 40, a dimming signal sampling circuit 50, a driving circuit 60, and a control unit 70.

Further, the power conversion unit 10 has an input end Input and an output end Output. The input end of the power conversion unit 10 may be connected to a DC power to receive an input voltage $V_{in}$, and the output end may be connected to LEDs. The power conversion unit 10 further comprises an inductor $L_1$ and a switch $Q_1$, and with an operation of the switch $Q_t$, converts the input voltage $V_{in}$ into an output voltage $V_{out}$ output from the output end, thereby driving the LEDs to illuminate. In the embodiment shown in FIG. 1, the power conversion unit 10 may be, for example, a Buck circuit, which includes a diode $D_1$, the inductor $L_1$, a capacitor $C_1$, and the switch $Q_1$. A control end of the switch $Q_1$ is electrically connected to the driving circuit 60 (e.g., a driver). A cathode end of the diode $D_1$ is electrically connected to the input end of the power conversion unit 10, one end of the capacitor $C_1$, and a positive output end of the power conversion unit 10, and an anode end of the diode $D_1$ is electrically connected to a second end of the switch $Q_1$ and one end of the inductor $L_1$. A first end of the switch $Q_1$ is grounded via a resistor $R_{es}$. The other end of the inductor $L_1$ is electrically connected to the other end of the capacitor $C_1$ and a negative output end of the power conversion unit 10. In other embodiments, the power conversion unit 10 may be a conversion unit in other circuit structures, but the invention is not limited thereto.

The input voltage sampling circuit 20 is configured to detect the input voltage $V_{in}$ of the power conversion unit 10 and generate an input voltage sampling signal to be output to the control unit 70 according to a detection result. In the embodiment shown in FIG. 1, the input voltage sampling circuit 20 may include a resistor $R_1$ and a resistor $R_2$ connected in series between a positive input end and a ground, with a common node being electrically connected to the control unit 70. In other embodiments, the input voltage sampling circuit 20 may be a sampling circuit in other circuit structures, but the invention is not limited thereto.

The output voltage sampling circuit 30 is configured to detect the output voltage $V_{out}$ of the power conversion unit 10 and generate an output voltage sampling signal to be input to the control unit 70 according to a detection result. In the embodiment shown in FIG. 1, the output voltage sampling circuit 30 may include a resistor $R_3$, a resistor $R_4$, and a switch $Q_2$, which are connected in series between the positive output end of the power conversion unit 10 and the ground, with a control end of the switch $Q_2$ being electrically connected to the negative output end of the power conversion unit 10. In other embodiments, the output voltage sampling circuit 30 may be a sampling circuit in other circuit structures, but the invention is not limited thereto.

The current sampling circuit 40 is configured to sample a current flowing through the switch $Q_1$ and generate a current sampling signal according to the detection result. In the embodiment shown in FIG. 1, the current sampling circuit 40 may include a current sampling resistor $R_{es}$, which has one end being electrically connected to the first end of the switch $Q_1$ and the control unit 70, and the other end being grounded. A voltage $V_{es}$, at a third end of the switch $Q_1$, corresponds to the current $I_{es}$ flowing through the switch $Q_1$ and may be sampled via the current sampling resistor $R_{es}$. In other embodiments, the current sampling circuit 40 may be a sampling circuit in other circuit structures, but the invention is not limited thereto.

The dimming signal sampling circuit 50 receives a dimming signal $S_1$ for adjusting the brightness (level) of the LED, calculates and generates a dimming current signal $I_{dim}$.

The control unit 70 receives the input voltage sampling signal, the output voltage sampling signal, the current sampling signal, and the dimming current signal $I_{dim}$, and outputs a control signal $S_2$ to the driving circuit 60 to control the switch $Q_1$. The driving circuit 60 is connected between the control unit 70 and the switch $Q_1$ and is configured to drive the switch $Q_1$ to turn on or turn off according to the control signal $S_2$ output from the control unit 70. In the embodiment shown in FIG. 1, the control unit 70 may be a microcontroller Unit (MCU) and digital signal processor (DSP), for example, but the case is not limited thereto.

The control unit 70 compares the dimming current signal $I_{dim}$ with a first current threshold $I_{th1}$ and a second current threshold $I_{th2}$, and controls an operating mode of the power conversion unit 10 according to a comparing result. When the dimming current signal $I_{dim}$ is higher than or equal to the first current threshold $I_{th1}$, the control unit 70 controls the power conversion unit 10 to operate in a Continuous Conduction Mode (CCM mode) or a Boundary Conduction Mode (BCM mode). When the dimming current signal $I_{dim}$, is lower than the first current threshold $I_{th1}$, the control unit 70 controls the power conversion unit 10 to operate in a discontinuous conduction mode (DCM mode). Further, in the DCM mode, when the dimming current signal $I_{dim}$ is lower than the second current threshold $I_{th2}$, the control unit 70 controls the power conversion unit 10 to operate in a chopping control mode.

Figure 2:
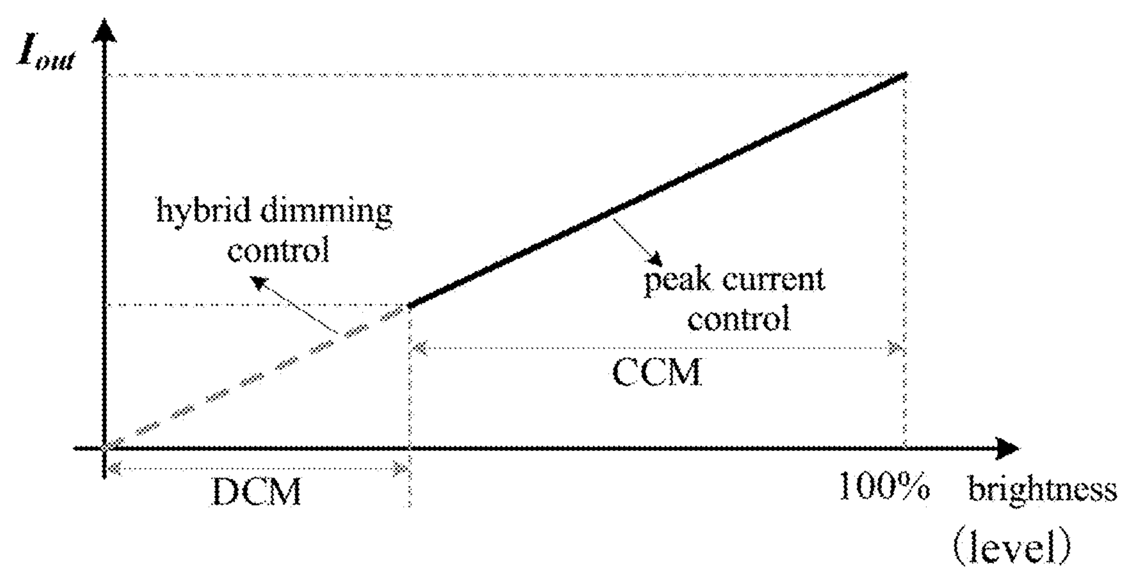
FIG. 2 is a schematic diagram illustrating the dimming control according to the first embodiment of the invention.

As shown in FIG. 2, in one embodiment, an output current $I_{out}$ may vary with the dimming current signal $I_{dim}$ within a full load range, with a linear relationship therebetween. The control unit 70 controls the power conversion unit 10 (e.g., the Buck circuit) to operate in two stages. When the output current $I_{out}$ is required to be relatively high, it is stage one in which the power conversion unit 10 is controlled to operate in the CCM mode. When the output current $I_{out}$ is required to decrease gradually, the power conversion unit 10 enters stage two, in which it operates in the DCM mode. The specific operating principle is as follows:

Stage one: when the dimming current signal $I_{dim}$ is higher than or equal to the first current threshold $I_{th1}$, the control unit 70 controls the power conversion unit 10 to operate in the CCM mode and performs peak current control by a sampling result of the current sampling circuit 40, thereby adjusting the output current $I_{out}$.

Figure 3:
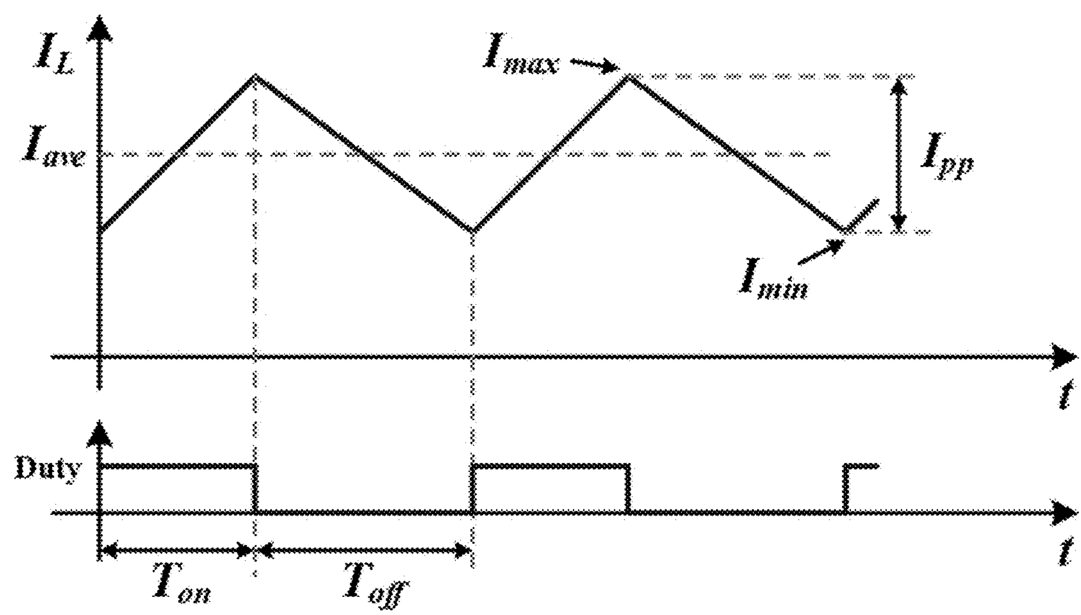
FIG. 3 is a schematic diagram illustrating a theoretical control waveform in a CCM mode according to the first embodiment of the invention.

In this stage, the output current $I_{out}$ may be controlled by using a fixed ripple current reference $I_{pp}$ and controlling an inductor peak current $I_{max}$ of the inductor $L_1$. A theoretical control waveform is shown in FIG. 3. According to the control waveform, an average $I_{ave}$ of the output current may be calculated as shown in formula (1). Moreover, an off time $T_{off}$ of the switch $Q_1$ may be calculated according to the ripple current reference $I_{pp}$, as shown in formula (2).

$$I_{ave} = \frac{I_{max} + I_{min}}{2} = I_{max} - \frac{I_{pp}}{2} \tag{1}$$

$$T_{off} = I_{pp} \cdot \frac{L}{V_{out}} \tag{2}$$

Therefore, the off time $T_{off}$ of the switch may be calculated according to the ripple current reference $I_{pp}$, and the output current may be controlled by adjusting the inductor peak current $I_{max}$. When the output current decreases gradually, the inductor peak current $I_{max}$ decreases gradually, and when $I_{max}$ is lower than $I_{pp}$, the Buck circuit enters into the DCM mode. At this time, the power conversion unit 10 enters into stage two.

Stage two: when the dimming current signal $I_{dim}$ is lower than the first current threshold $I_{th1}$, the control unit 70 controls the power conversion unit 10 to operate in the DCM mode. For example, the control unit 70 may perform hybrid dimming control.

In some embodiments, the DCM mode may adopt a constant frequency control, in which the switching frequency is fixed, an on time of the switch Q1 is calculated according to the dimming current signal, the input voltage, and the output voltage, and the output current is adjusted by adjusting the duty cycle. Further, when the dimming current signal is lower than the second current threshold $I_{th2}$, the duty cycle is fixed and the output current is adjusted by adjusting the number of driving pulses by chopping.

In some other embodiments, in the DCM mode, a variable frequency control may be adopted firstly, and the constant frequency control may be used after that. That is, when the dimming current signal $I_{dim}$ is higher than or equal to the third current threshold $I_{th3}$, and lower than the first current threshold $I_{th1}$, a switching period $T_s$ and an on time $T_{on}$ are calculated to perform the variable frequency control. Further, when the dimming current signal $I_{dim}$ is lower than the third current threshold $I_{th3}$ and higher than or equal to the second current threshold $I_{th2}$, the constant frequency control as described above is adopted. Further, in the DCM mode, when the dimming current is lower than the second current threshold $I_{th2}$, the duty cycle is fixed and the output current is adjusted by adjusting the number of driving pulses by chopping.

Hereinafter, two dimming control methods for the dimming circuit in the first embodiment of the invention are explained in detail by referring to FIGS. 4-14.

Figure 4:
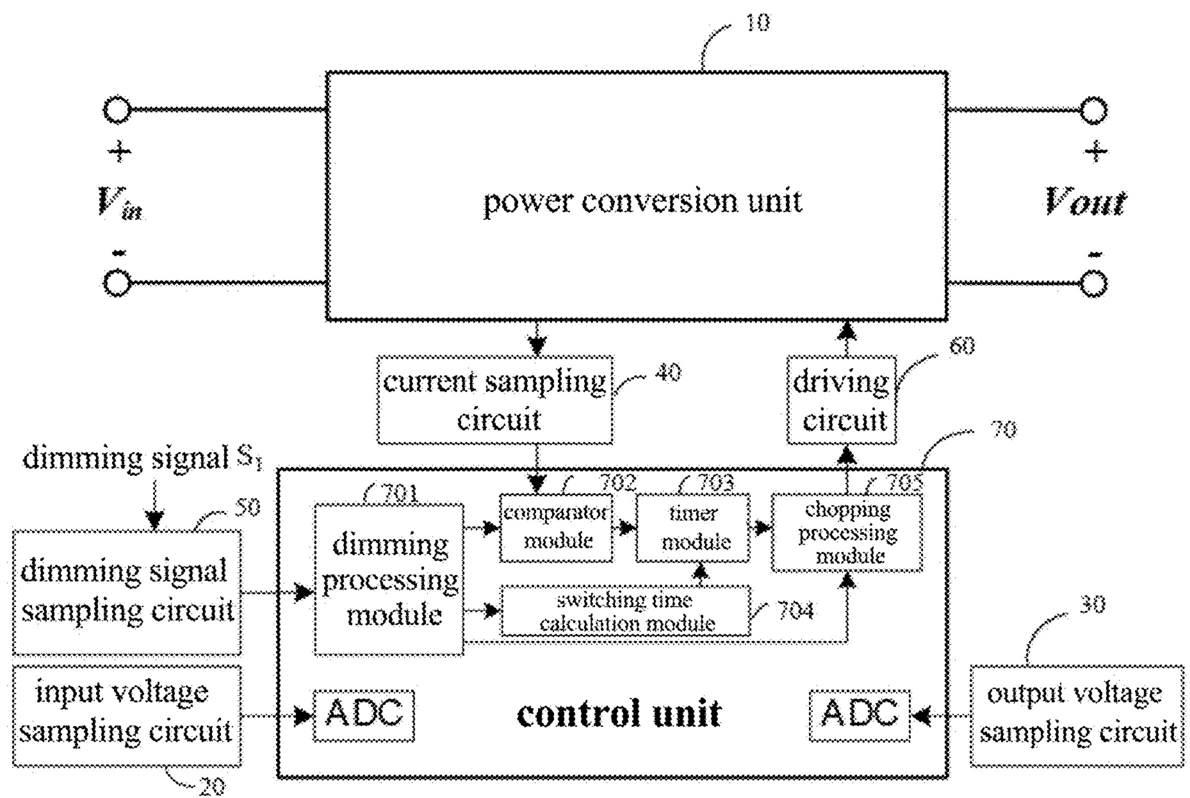
FIG. 4 is a block diagram illustrating a dimming circuit according to the first embodiment of the invention.

FIG. 4 shows a block diagram illustrating a dimming circuit in the first embodiment, which mainly comprises a power conversion unit 10, an input voltage sampling circuit 20, an output voltage sampling circuit 30, a current sampling circuit 40, a driving circuit 60, a dimming signal sampling circuit 50 and a control unit 70. The power conversion unit 10 may be a Buck circuit, but the invention is not limited thereto. The input voltage sampling circuit 20 samples an input voltage at an input end of the power conversion unit 10. The output voltage sampling circuit 30 samples an output voltage at an output end of the power conversion unit 10. The input voltage sampling circuit 20 and the output voltage sampling circuit 30 are further electrically connected to an analog digital converter (ADC) in the control unit, respectively. The current sampling circuit 40 samples an inductor current in the power conversion unit 10 or a current flowing through the switch. The dimming signal sampling circuit 50 is electrically connected to the control unit 70 and receives a dimming signal $S_1$.

The control unit 70 may further comprise a dimming processing module 701, a comparator module 702, a timer module 703, a switching time calculation module 704, and a chopping processing module 705. The control unit 70 may be a Microcontroller Unit (MCU) and Digital Signal Processor (DSP), but the case is not limited thereto. The comparator module 702 may be a comparator. The timer module 703 may be a timing counter inside the control unit 70. The switching time calculation module 704 is configured to calculate a switching period $T_s$, an on time $T_{on}$, or an off time $T_{off}$ of the switch. The chopping processing module 705 is configured to perform a chopping control when the chopping control is triggered. The control unit 70 drives the switch in the power conversion unit 10 through the driving circuit 60.

The dimming signal sampling circuit 50 generates a dimming current signal $I_{dim}$ upon receiving the dimming signal $S_1$. The control unit 70 determines an operating stage or an operating state of the power conversion unit according to the dimming current signal $I_{dim}$ and sets an input reference for the comparator or calculates the on time $T_{on}$, the off time $T_{off}$, and the chopping control according to the dimming current signal.

Figure 5:
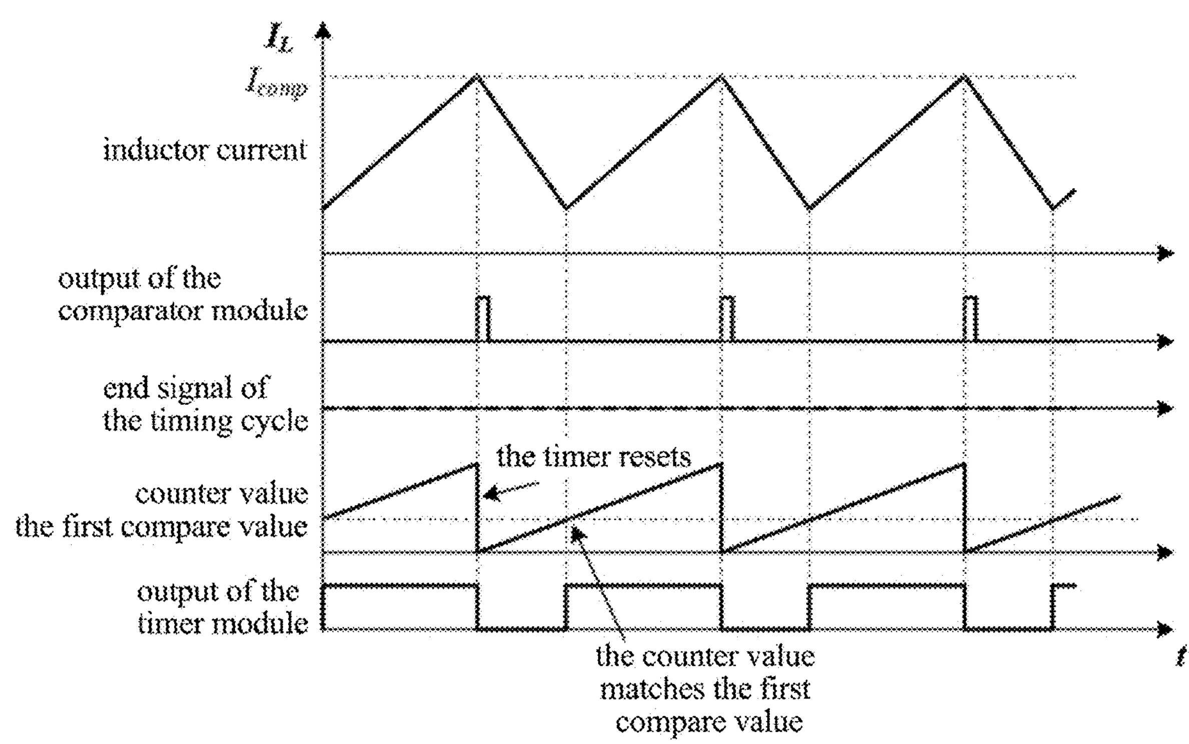
FIG. 5 is a schematic diagram illustrating a control waveform in the CCM mode according to the first embodiment of the invention.

Detailed Control Manner in Stage One:

When the control unit 70 receives the dimming current signal $I_{dim}$ and determines that the dimming current signal $I_{dim}$ is higher than or equal to the first current threshold $I_{th1}$, the control unit may set a ripple current reference $I_{pp}$, and the control unit 70 controls the power conversion unit 10 to operate in stage one. For example, the buck circuit operates in the CCM mode, and the chopping processing module 705 is disabled (i.e., inoperative). The dimming processing module 701 calculates a peak current reference $I_{comp}$ according to the dimming current signal $I_{dim}$, thereby controlling the peak current of the inductor. The specific control waveform is shown in FIG. 5. When the inductor current is lower than $I_{comp}$, counter value of the timer module (timing counter) inside the control unit 70 increases gradually, the output of the timer module is high level, the switch $Q_1$ is in on state, and the inductor current increases gradually. When the inductor current is equal to $I_{comp}$, the comparator module 702 outputs a pulse signal for resetting the timer module 703, the counter value of the timer module 703 is cleared, the output of the timer module 703 changes to a low level, the switch in the power conversion unit 10 is turned off, then the inductor current decreases. When the timer module 703 starts counting again from zero and the counter value increases to a first compare value, an output of the timer module 703 is flipped over to a high level, the switch in the power conversion unit 10 is turned on again, and then the inductor current increases. The whole control cycle repeats. Accordingly, the control signal formed of a plurality of pulses is output, such that the power conversion unit 10 operates in the continuous conduction mode. A specific waveform of the inductor current is shown in FIG. 5. The first compare value reflects the off time of the switch Q1, and corresponds to $T_{off}$ calculated according to formula (2).

Wherein, stage two may be realized in two control strategies, one including a constant frequency DCM mode for the entire stage two, and the other one including the constant frequency DCM mode and a variable frequency DCM mode during stage two.

Control Strategy I in Stage Two:

A fixed switching frequency is adopted in the entire DCM mode. The on time of the switch is calculated according to the input voltage and the output voltage, and an output current is adjusted by adjusting a duty cycle. Specifically, formulas (3)-(6) may be obtained according to an ideal discontinuous current waveform shown in FIG. 6. As may be seen from formula (6), the output current $I_{out}$ is associated with the on time $T_{on}$ of the switch, such that the output current may be controlled by controlling the on time $T_{on}$.

$$I_{max} = \frac{T_{on} \cdot (V_{in} - V_{out})}{L} \tag{3}$$

$$T_{off} = I_{max} \cdot \frac{L}{V_{out}} = \frac{T_{on} \cdot (V_{in} - V_{out})}{V_{out}} \tag{4}$$

$$I_{out} = I_{ave} = \frac{I_{max}}{2} \cdot \frac{(T_{on} + T_{off})}{\frac{1}{fs}} \tag{5}$$

$$T_{on} = \sqrt{\frac{2 \cdot L \cdot V_{out} \cdot I_{out}}{f_s \cdot V_{in} \cdot (V_{in} - V_{out})}} \tag{6}$$

Figure 7:
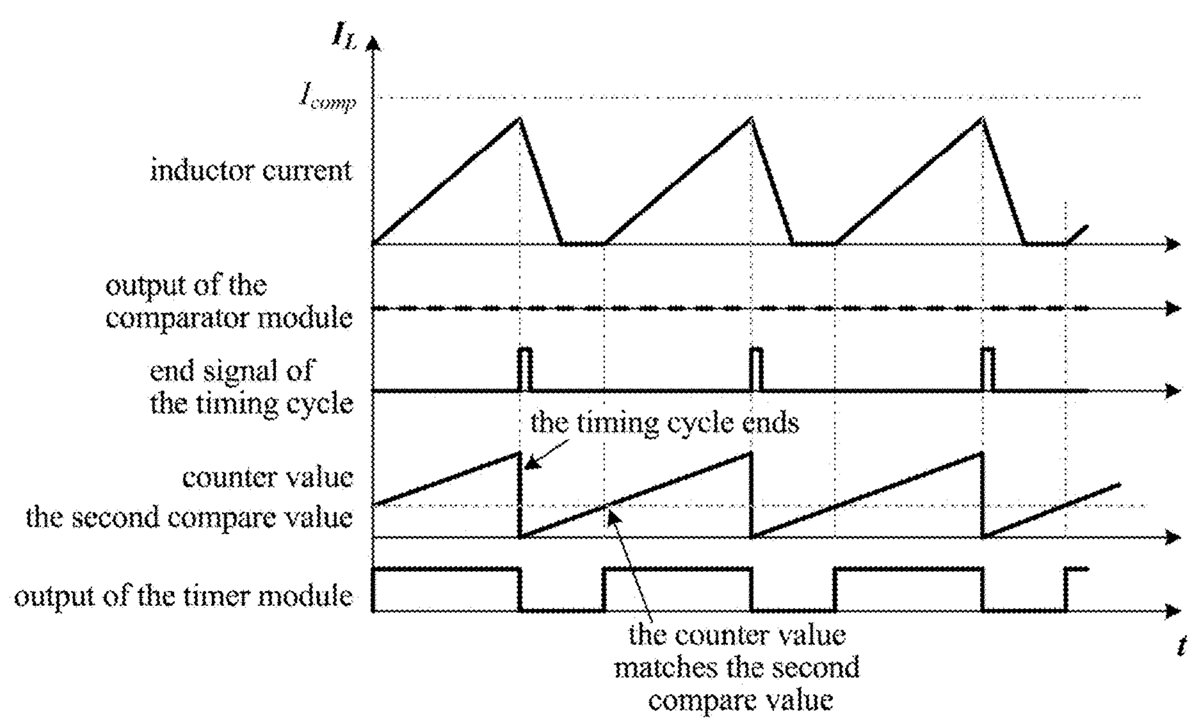
FIG. 7 is a schematic diagram illustrating a control waveform adopting a control strategy I, i.e., a constant frequency DCM mode according to the first embodiment of the invention.

Specifically, when the dimming current signal $I_{dim}$ is lower than the first current threshold $I_{th1}$, the switching time calculation module 704 sets a fixed switching period $T_s$ and calculates the on time $T_{on}$ of the switch according to the input voltage $V_{in}$, the output voltage $V_{out}$ and the dimming current signal $I_{dim}$. When the dimming current signal $I_{dim}$ is higher than or equal to the third current threshold $I_{th3}$, and lower than the first current threshold $I_{th1}$, a chopping control module is in a disabled state, and driving pulses of the driving circuit are completely dependent on the output of the timer module 703. As shown in FIG. 7, the maximum counter value of the timer module 703 is set according to the fixed switching period $T_s$, and a second compare value of the timer module 703 is set by subtracting the on time $T_{on}$ from the fixed switching period $T_s$. Since the inductor peak current in the DCM mode is lower than $I_{comp}$, an output of the comparator module 702 is always low and does not function. The output of the timer module 703 is in a low level when the counter value is lower than the second compare value and is in a high level when the counter value is higher than the second compare value. Moreover, when the counter value increases to the maximum counter value, the timer module 703 is cleared and starts counting again, and the output is flipped over to a low level. The whole control cycle repeats. Accordingly, the control signal formed of a plurality of pulses is output, such that the power conversion unit 10 operates in a constant frequency discontinuous conduction mode.

Figure 8:
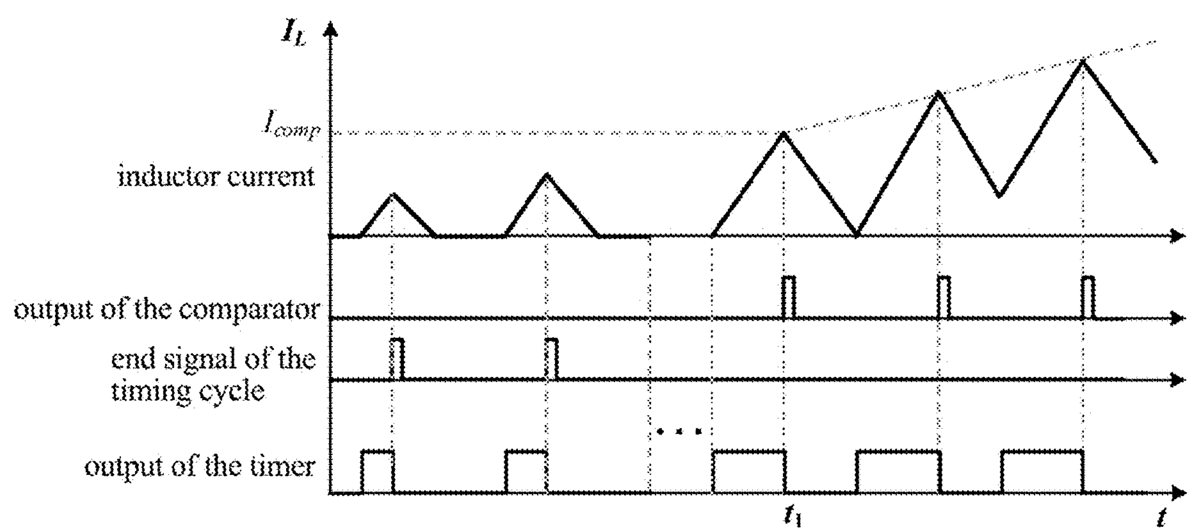
FIG. 8 is a schematic diagram illustrating a control waveform in the constant frequency DCM mode and the CCM mode according to the first embodiment of the invention.

Since a switching frequency in the CCM mode is not fixed, while the constant frequency control is used in the DCM mode, and the control manners in the CCM mode and the DCM mode are different, switching between the CCM mode and DCM mode shall be accurately controlled. According to the volt-ampere characteristic curve of the LED, the output voltage is substantially constant when the LED operates, and when $I_{pp}$ is fixed, a switching frequency $f_s$ of the Buck circuit is also substantially constant. To ensure smoothness of current in switching, the input voltage may be suitably adjusted according to the output voltage, such that an operating frequency in the CCM mode is proximate to an operating frequency in the DCM mode as could as possible. The control waveform during on and off is shown in FIG. 8. The Buck circuit operates in the DCM mode before $t_1$, and the peak current reference $I_{comp}$ of the comparator module 702 may be fixed to a reference value corresponding to the first current threshold $I_{th1}$. As a duty cycle of PWM increases gradually, the output current increases gradually. When the dimming current signal $I_{dim}$ increases to $I_{th1}$, i.e., the inductor peak current reaches $I_{comp}$, the comparator module starts operating. Then, the Buck circuit operates in the CCM mode to control in the control manner of the CCM mode.

Figure 10:
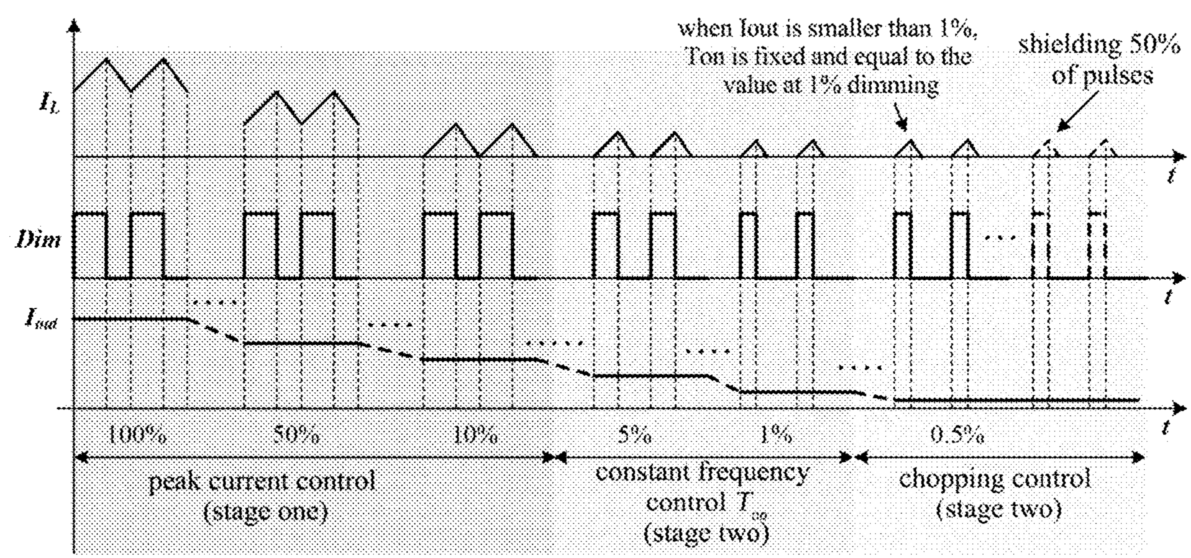
FIG. 10 is a schematic diagram illustrating a control waveform within a full load range adopting the control strategy I in stage two according to the first embodiment of the invention.

Further, when the dimming current signal $I_{dim}$ is lower than the second current threshold $I_{th2}$, the chopping processing module 705 starts operating and calculates a chopping ratio to chop pluses output from the timer module 703 according to $I_{dim}$, as shown in FIG. 10. Moreover, a duty cycle of the pulses output from the timer module 703 keeps a fixed duty cycle when $I_{dim}$ is equal to the second current threshold $I_{th2}$.

Figure 9:
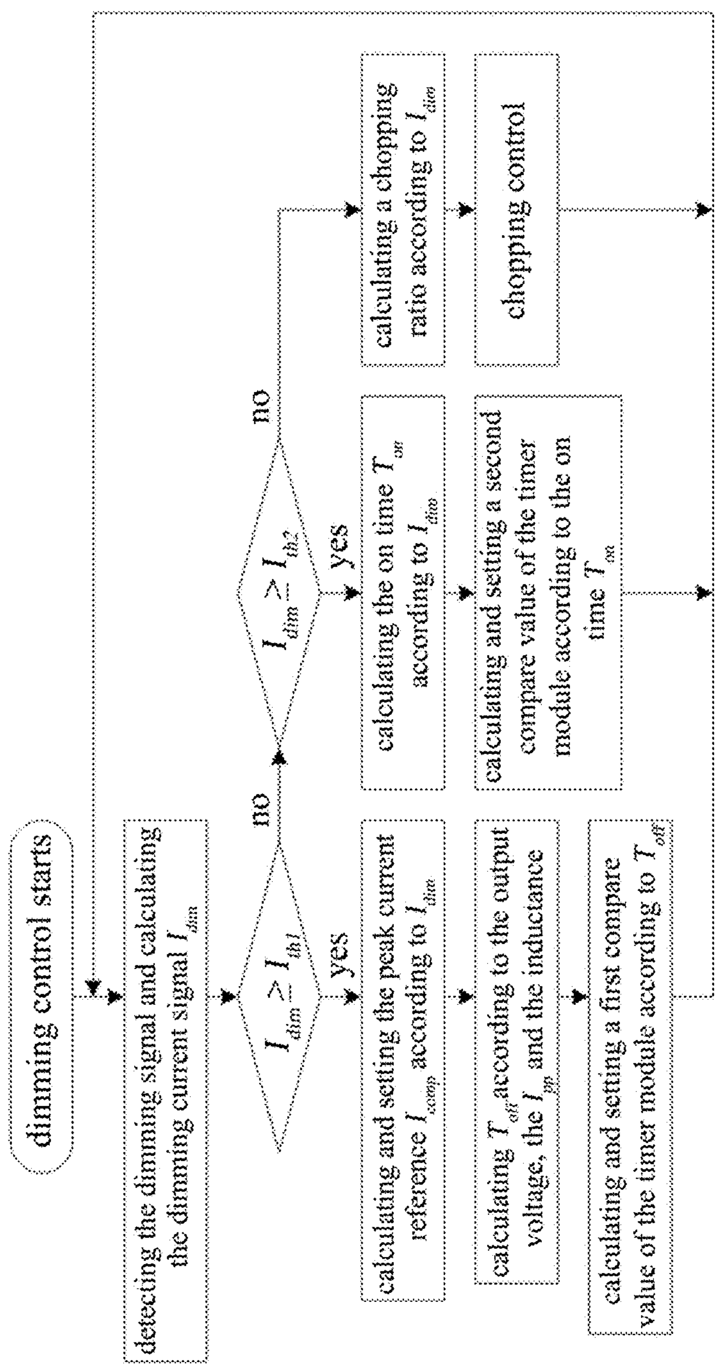
FIG. 9 is a complete control flow diagram adopting a control strategy I in stage two according to the first embodiment of the invention.

A complete control flow diagram is shown in FIG. 9. After dimming control starts, the dimming signal is detected, and the dimming current signal $I_{dim}$ is calculated. When the dimming current signal $I_{dim}$ is higher than or equal to the first current threshold $I_{th1}$, the Buck circuit operates in the CCM mode. The control unit calculates and sets the peak current reference $I_{comp}$ according to $I_{dim}$, calculates the off time $T_{off}$ according to the output voltage, the ripple current reference $I_{pp}$ and the inductance of the inductor, and calculates and sets the first compare value according to the off time $T_{off}$. When $I_{dim}$ is lower than the first current threshold $I_{th1}$ and higher than or equal to the second current threshold $I_{th2}$, the control unit controls the main circuit to operate in stage two, and the Buck circuit operates in the constant DCM mode to calculate the on time $T_{on}$ for control and set the second compare value of the timer module to generate a control signal according to the calculated on time $T_{on}$. When the dimming current signal $I_{dim}$ is lower than the second current threshold $I_{th2}$ (a critical current value in chopping control), chopping control is conducted by using a fixed duty cycle. A schematic diagram illustrating a control waveform within a complete output current range is shown in FIG. 10. As shown in FIG. 10, peak current control may be adopted in stage one, and constant frequency control and chopping control may be adopted in stage two.

Figure 11:
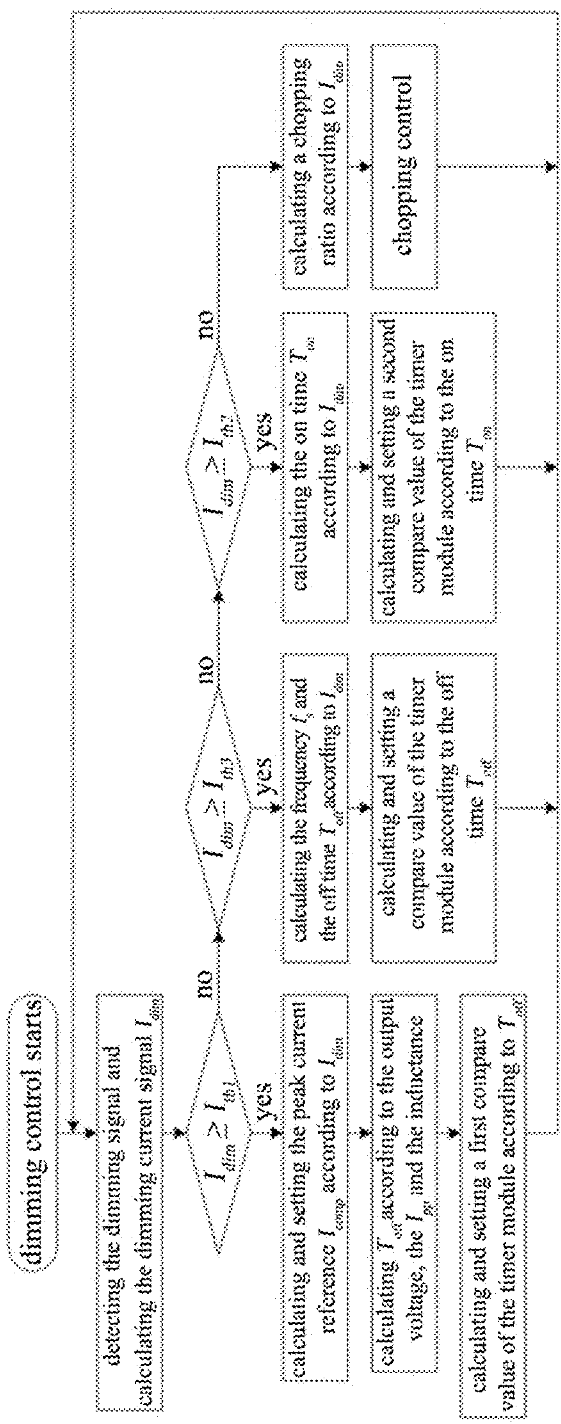
FIG. 11 is a complete control flow diagram adopting a control strategy II, i.e., a variable frequency DCM mode and the constant frequency DCM mode, according to the first embodiment of the invention.

Control Strategy II in Stage Two:

There are variable frequency control and constant frequency control in the DCM mode. A complete control flow diagram is shown in FIG. 11, which adds a third current threshold $I_{th3}$ based on the control flow diagram of FIG. 9. When the dimming current signal $I_{dim}$ is higher than the third current threshold $I_{th3}$ and lower than the first current threshold $I_{th1}$, the circuit operates in the variable frequency DCM mode. When the dimming current signal $I_{dim}$ is higher than or equal to the second current threshold $I_{th2}$ and lower than the third current threshold $I_{th3}$, a fixed switching period $T_s$ is set, and the circuit operates in the constant frequency DCM mode (similar with FIG. 9). When the dimming current signal $I_{dim}$ is lower than the second current threshold $I_{th2}$, the circuit operates in the chopping control mode (similar to FIG. 9).

Figure 6:
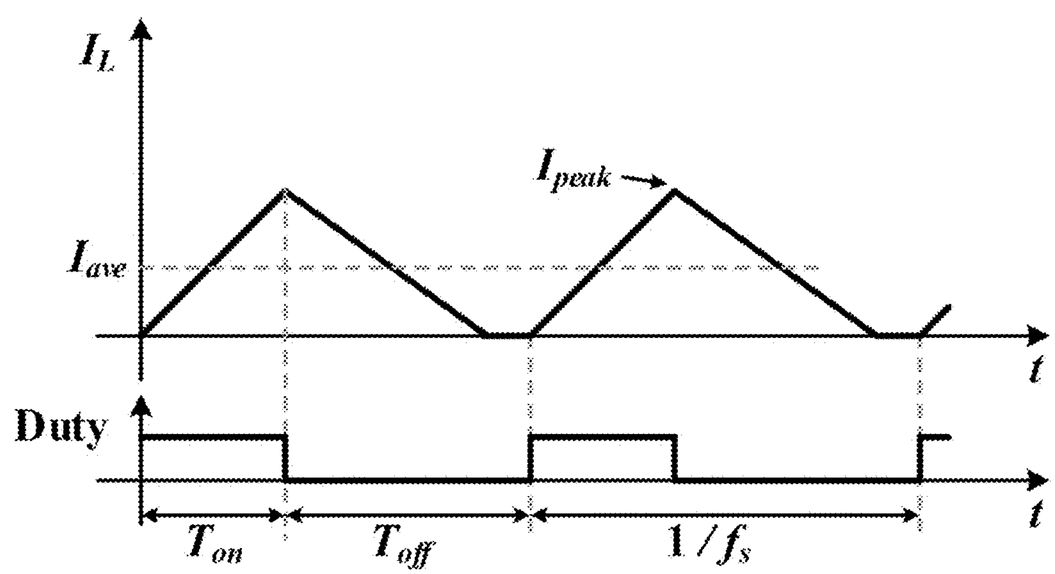
FIG. 6 is a schematic diagram illustrating a theoretical control waveform (not including a chopping wave) in a DCM mode according to the first embodiment of the invention.

Specifically, after dimming control starts, the dimming signal is detected, and the dimming current signal $I_{dim}$ is calculated. When $I_{dim}$ is higher than $I_{th1}$, the Buck circuit operates in the CCM mode. The control unit calculates and sets the peak current reference $I_{comp}$ according to dimming current signal $I_{dim}$, calculates the off time $T_{off}$ according to the output voltage, the ripple current reference $I_{pp}$ and the inductance of the inductor, and calculates and sets the first compare value according to the off time $T_{off}$. When $I_{dim}$ is lower than $I_{th1}$, and higher than $I_{th2}$, the control unit controls the main circuit to operate in the variable frequency DCM mode. A theoretical waveform of the inductor current is shown in FIG. 6. The output current $I_{out}$ may be calculated, as shown in formula (7). Referring to formulas (8) and (9), a relationship between the switching frequency $f_s$ and the output current $I_{out}$ may be obtained, as shown in formula (10), so control of the output current $I_{out}$ may be realized by controlling the switching frequency $f_s$.

$$I_{out} = \frac{I_{peak} \cdot (T_{on} + T_d)}{2} \cdot f_s \tag{7}$$

wherein, $$T_{on} = \frac{L}{V_{in} - V_{out}} \cdot I_{peak} \tag{8}$$

$$T_d = \frac{L}{V_{out}} \cdot I_{peak} \tag{9}$$

$$f_s = \frac{2 \cdot I_{out} \cdot V_{out} \cdot (V_{in} - V_{out})}{I_{peak}^2 \cdot L \cdot V_{in}} \tag{10}$$

Figure 12:
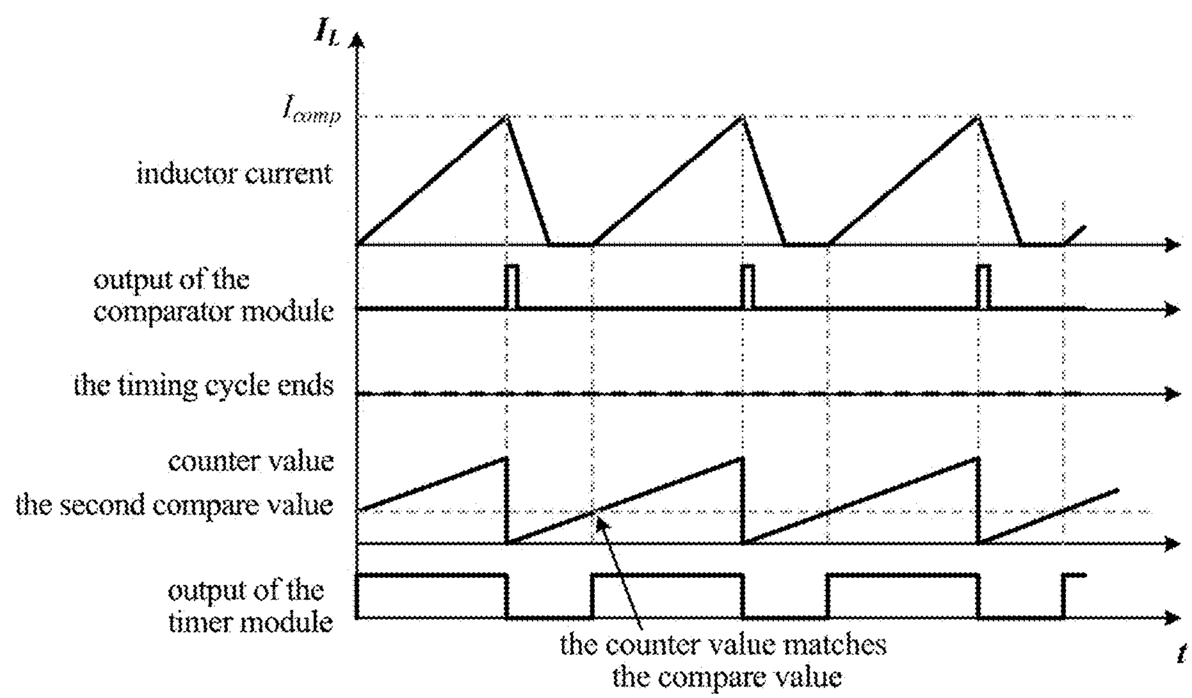
FIG. 12 is a schematic diagram illustrating a control waveform in the variable frequency DCM mode according to the first embodiment of the invention.

A specific control waveform in the variable frequency DCM is shown in FIG. 12. The dimming processing module 701 fixes the peak current reference $I_{comp}$ to be a peak reference corresponding to the first current threshold $I_{th1}$, the switching time calculation module 704 calculates the switching period $T_s$ according to the input voltage, the output voltage, the dimming current signal $I_{dim}$ and the peak current reference (i.e., the ripple current reference $I_{pp}$). The timer module 703 sets the maximum counter value according to the switching period $T_s$. The switching time calculation module 704 calculates the on time $T_{on}$ of the switch according to the input voltage, the output voltage, and the peak current reference (i.e., the ripple current reference $I_{pp}$). The second compare value of the timer module 703 is set according to the off time $T_{off}$ of the switch, i.e., by subtracting the on time $T_{on}$ from the fixed switching period $T_s$. As shown in FIG. 12, when the counter value is lower than the second compare value, an output of the timer module 703 is in a low level, and when the counter value is higher than the second compare value, the output is in a high level. Moreover, when the inductor current is equal to the peak current reference $I_{comp}$, the timer module 703 is cleared, and the output is changed to a low level, and the timer module 703 starts counting again from zero to control the next cycle. The whole control cycle repeats. Accordingly, the control signal formed of a plurality of pulses is output, such that the power conversion unit 10 operates in a discontinuous conduction mode. A specific waveform of the inductor current is shown in FIG. 12.

When $I_{dim}$ is lower than the third current threshold $I_{th3}$ and higher than or equal to the second current threshold $I_{th2}$, the circuit enters into the constant frequency DCM mode which is similar to FIG. 7, so the details are not described here.

Figure 13:
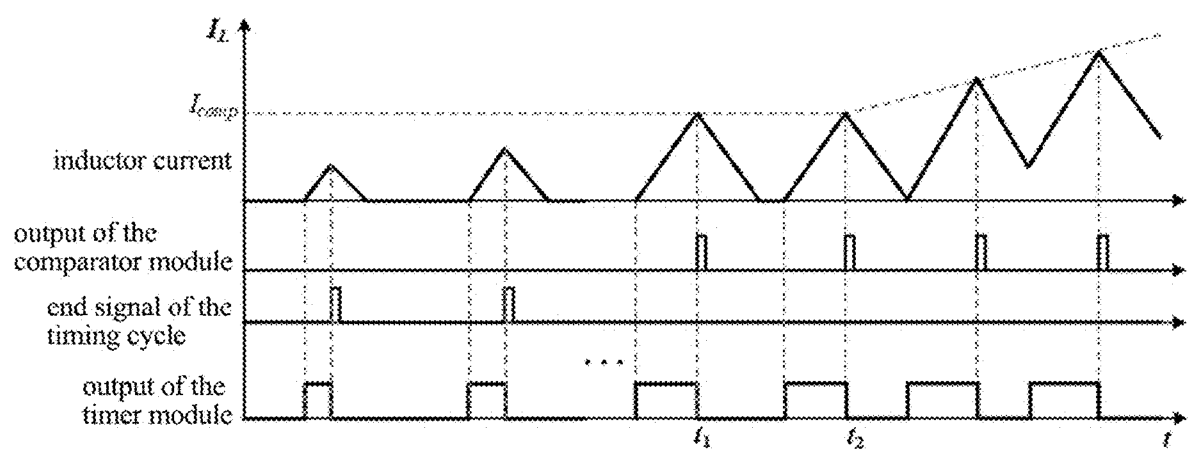
FIG. 13 is a schematic diagram illustrating a control waveform in the variable frequency DCM mode and the CCM mode according to the first embodiment of the invention.

Further, switching between the CCM mode and the DCM mode is shown in FIG. 13. The circuit operates in the constant frequency DCM mode before the time $t_1$. As the output current increases, an inductor peak current increases gradually. When the inductor peak current is equal to $I_{comp}$, the circuit is switched to the variable frequency DCM mode (at time $t_1$). When the current further increases, the switching frequency also increases. When the switching frequency increases to a boundary CCM mode (at time $t_2$), the circuit is switched to the CCM mode to control in the control manner of the CCM mode.

Figure 14:
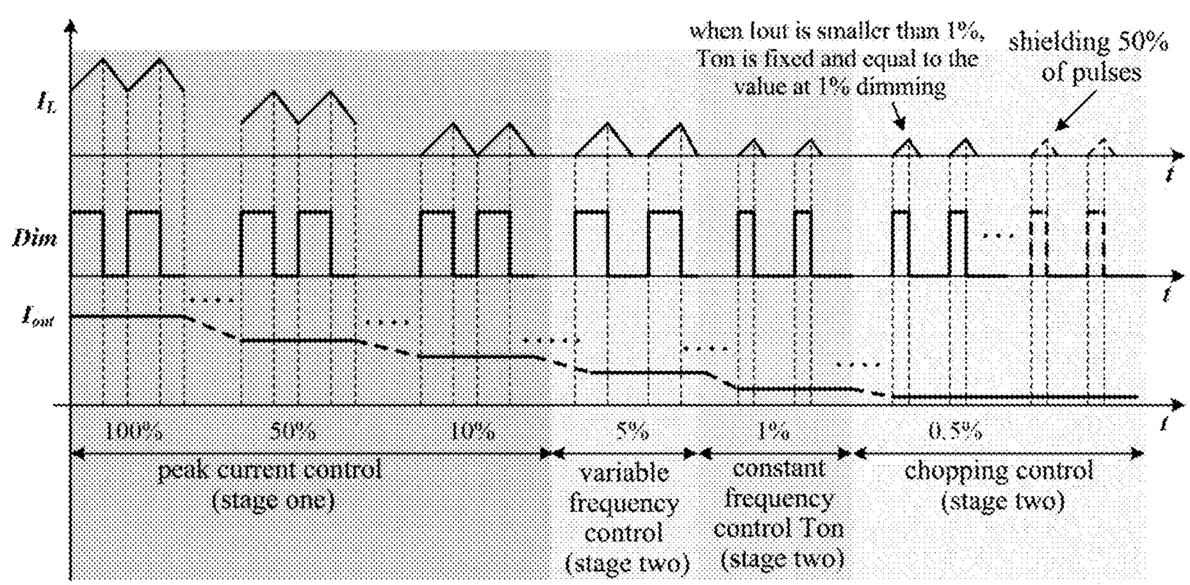
FIG. 14 is a schematic diagram illustrating a control waveform within a full load range adopting the control strategy II in stage two according to the first embodiment of the invention.

When $I_{dim}$ is lower than $I_{th3}$, the Buck circuit operates in a chopping mode. A schematic diagram illustrating a control waveform within a complete output current range is shown in FIG. 14, wherein the output current is adjusted by chopping and adjusting the number of driving pulses with a fixed duty cycle. As shown in FIG. 14, peak current control may be adopted in stage one, and variable frequency control, constant frequency control and chopping control may be adopted in stage two.

Figure 15:
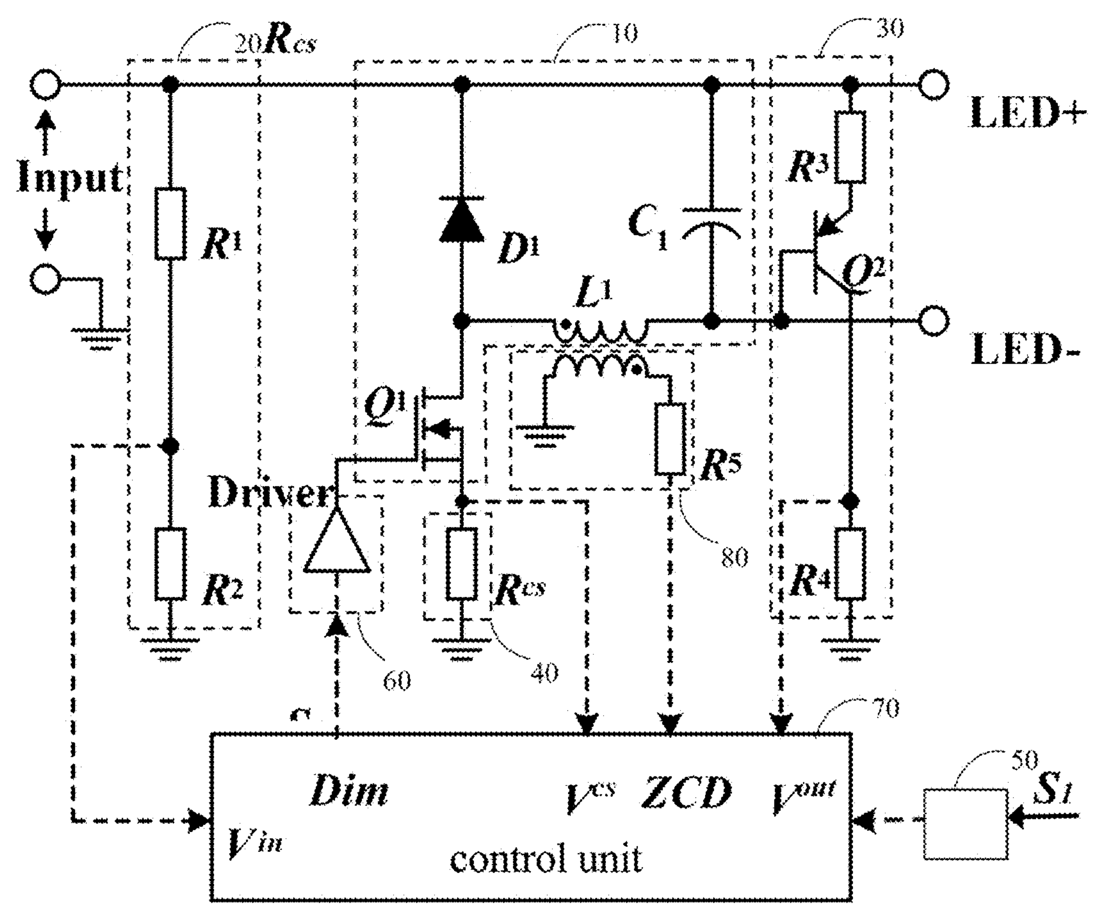
FIG. 15 is a block diagram illustrating a dimming circuit according to a second embodiment of the invention.

FIG. 15 is a circuit block diagram illustrating a dimming circuit according to a second embodiment of the invention. The dimming circuit further includes a zero-crossing detection circuit 80, which differs from the embodiment of FIG. 1. The zero-crossing detection circuit 80 is configured to detect a zero-crossing point of an inductor current of the power conversion unit 10 and generate a zero-crossing detection signal $I_{zero}$ according to the detection result.

Figure 16:
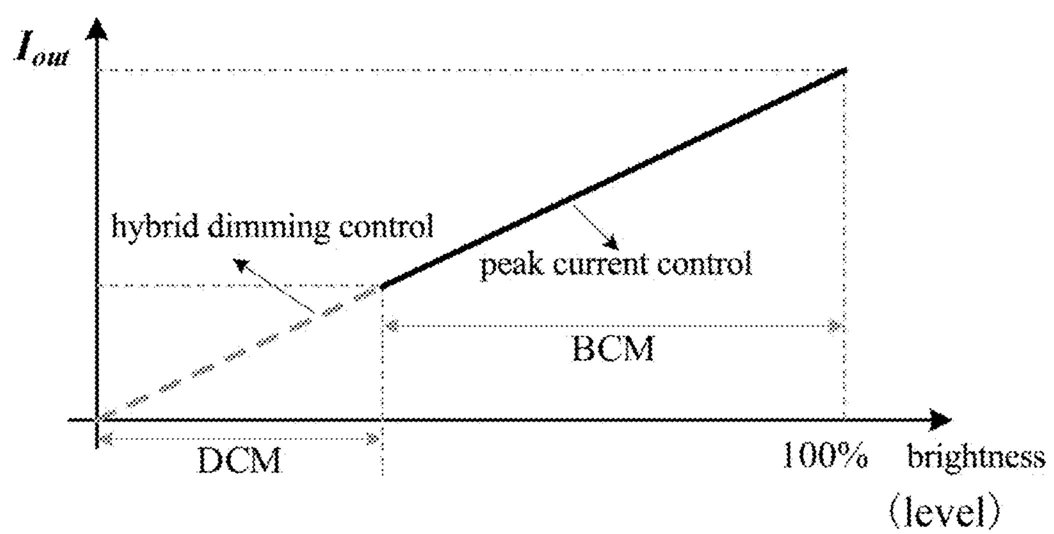
FIG. 16 is a schematic diagram illustrating a dimming control mode according to the second embodiment of the invention.

As shown in FIG. 16, the control unit of the present invention may control the power conversion unit 10 (e.g., the Buck circuit) to operate in two stages according to different output currents $I_{out}$ of the power conversion unit 10. When the output current is required to be large, the power conversion unit 10 operates in stage one in which it is controlled to operate in the BCM mode. When the output current is required to beneath a certain value, the power conversion unit 10 operates in stage two in which it is controlled to operate in the DCM mode. The specific operating principle is as follows:

Stage one: when the dimming current signal $I_{dim}$ is higher than or equal to the first current threshold $I_{th1}$, the control unit 70 controls the power conversion unit 10 to operate in the BCM mode, performs peak current control by using a sampling result of the current sampling circuit 40, and makes dimming circuit to operate in the BCM mode through the zero-crossing signal $I_{zero}$ detected by the zero-crossing detection circuit 80.

Stage two: when the dimming current signal $I_{dim}$ is lower than the first current threshold $I_{th1}$, the control unit 70 controls the power conversion unit 10 to operate in the DCM mode, calculates the on time $T_{on}$ according to the input voltage and output voltage, the inductance of the inductor and the dimming current signal $I_{dim}$, and adjusts the output current by adjusting the duty cycle. When the dimming current signal $I_{dim}$ is lower than the second current threshold $I_{th2}$, or the duty cycle is lower than a certain value, the output current is adjusted by chopping and adjusting the number of driving pulses with a fixed duty cycle and according to the dimming current signal $I_{dim}$.

Figure 17:
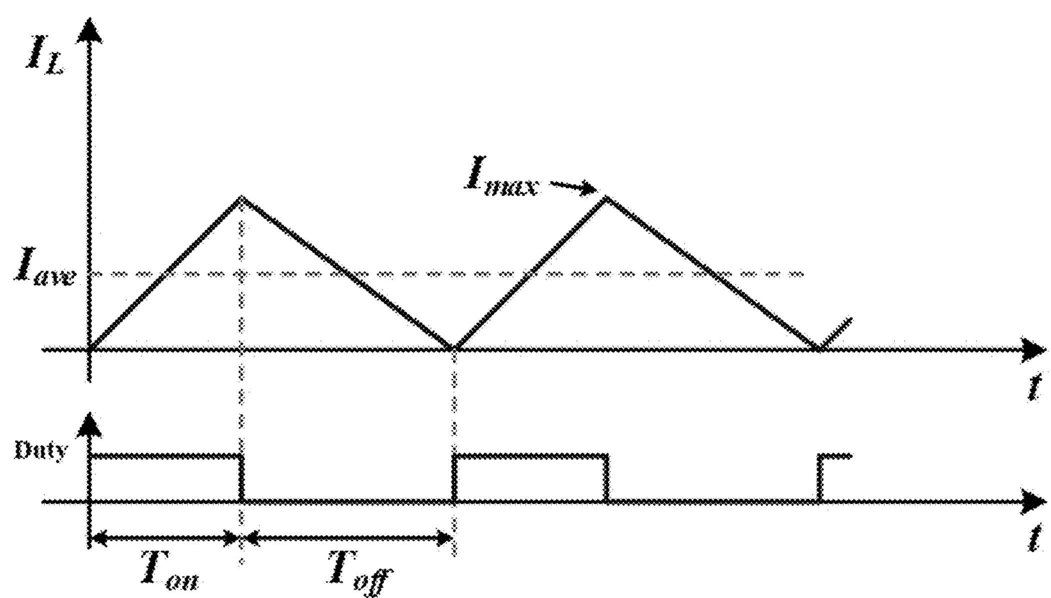
FIG. 17 is a schematic diagram illustrating a theoretical control waveform in a BCM mode according to the second embodiment of the invention.

Specifically, in stage one, the power conversion unit 10 operates in the BCM mode. A theoretical control waveform is shown by the inductor current in FIG. 17. The output current $I_{out}$ is calculated by the formula (11):

$$I_{out} = I_{ave} = \frac{I_{max}}{2} \quad (11)$$

A point of the switch $Q_1$ to be turned on is determined by a zero-crossing point signal $I_{ZCD}$. When the switch $Q_1$ is turned on, and the inductor current increases. When the inductor current increases to the inductor peak current $I_{max}$, the switch $Q_1$ is turned off, and the inductor current decreases. When the inductor current decreases to zero, the switch $Q_1$ is turned on again. Therefore, an average value $I_{ave}$ of the output current may be controlled by controlling the inductor peak current $I_{max}$ according to the dimming current signal.

Referring to FIGS. 18-22, a dimming control method of the dimming circuit according to the second embodiment of the invention is explained in detail hereinafter.

Figure 18:
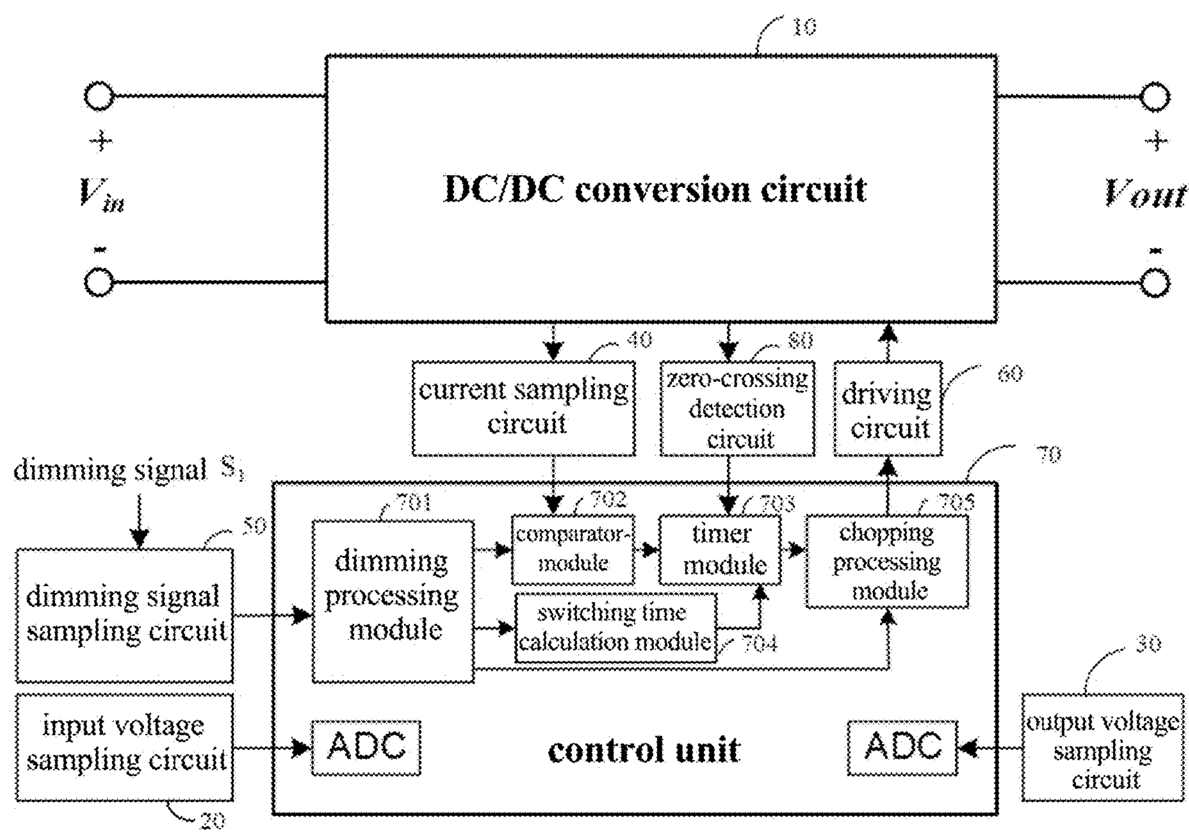
FIG. 18 is a block diagram illustrating specific control of the dimming circuit according to the second embodiment of the invention.

The specific control block diagram of the dimming circuit in the second embodiment is shown in FIG. 18, which further includes a zero-crossing detection circuit 80 compared with the embodiment of FIG. 4.

When the dimming signal sampling circuit 50 generates the dimming current signal $I_{dim}$ after receiving the dimming signal $S_1$, the control unit 70 determines the operating stage or operating state of the power conversion unit according to the dimming current signal $I_{dim}$, and finally to set the peak current reference or calculating the on time $T_{on}$ and chopping control.

Figure 19:
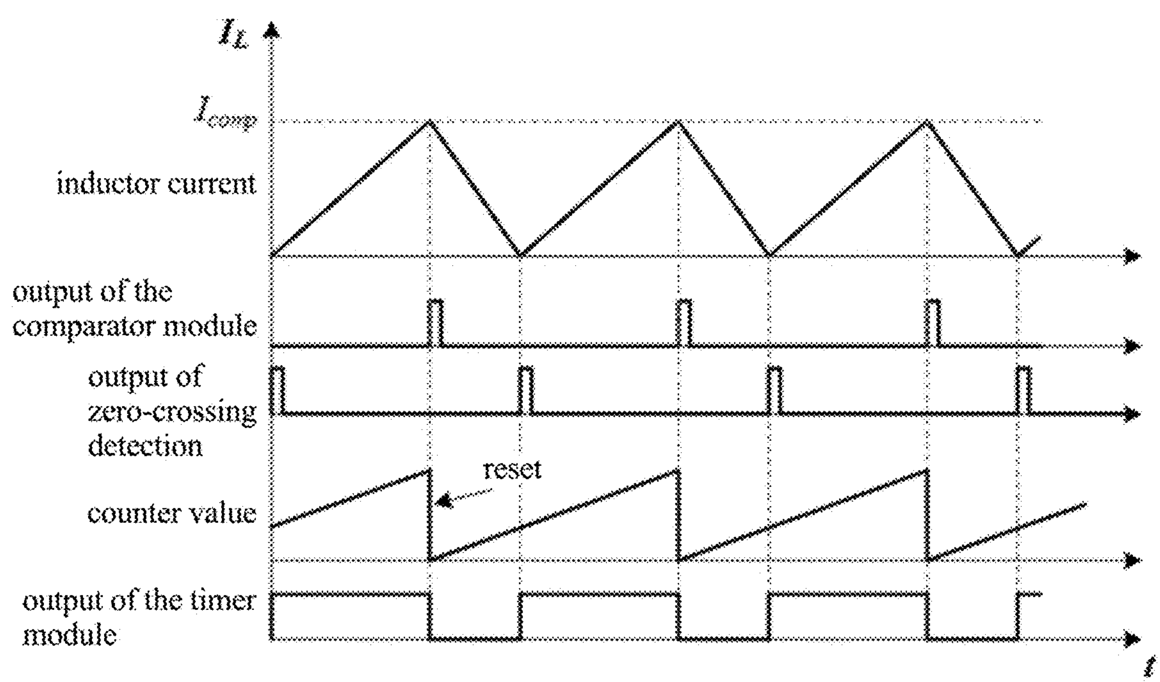
FIG. 19 is a schematic diagram illustrating a control waveform in the BCM mode according to the second embodiment of the invention.

Specifically, when the dimming current signal $I_{dim}$ is higher than the first current threshold $I_{th1}$, the control unit 70 controls the power conversion unit 10 to operate in the BCM mode, and the chopping processing module 705 is in a disable state (i.e., no function). The dimming processing module 701 calculates the peak current reference $I_{comp}$ according to the dimming current signal $I_{dim}$, thereby controlling an inductor peak current. The specific control waveform is shown in FIG. 19. When the current sampling signal is lower than $I_{comp}$, the timer module 703 outputs a high level, the switch $Q_1$ of the power conversion unit 10 is turned on, and the inductor current increases gradually. When the current sampling signal is equal to $I_{comp}$, the comparator module 702 outputs a pulse signal to reset the timer module. At this time, counter value is cleared, and the timer module starts counting again from zero. Meanwhile, the output of the timer module is changed to a low level, thereby controlling the switch $Q_1$ of the power conversion unit 10 to turn off, and the inductor current decreases. When the zero-crossing detection circuit 80 detects a zero-crossing point of the inductor current, a pulse is output to indicate the point of zero-crossing, an output of the timer module 703 is flipped over to a high level, thereby controlling the switch $Q_1$ of the power conversion unit 10 to turn on, and the inductor current increases. The whole control cycle repeats.

Figure 20:
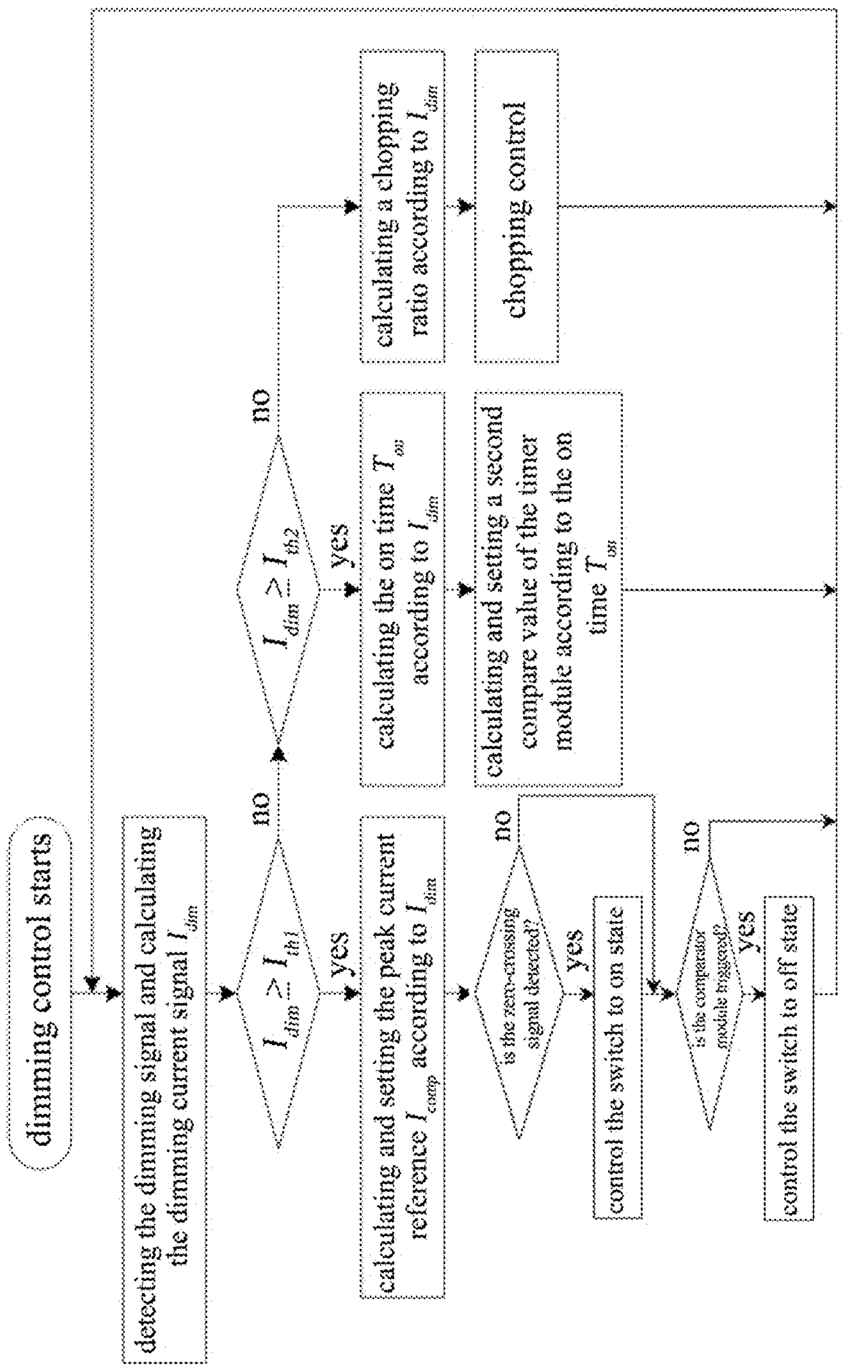
FIG. 20 is a complete control flow diagram according to the second embodiment of the invention.

When the dimming current signal $I_{dim}$ is lower than the first current threshold $I_{th1}$, the control unit 70 controls the DC/DC conversion circuit 10 to operate in stage two, i.e., DCM mode. The control mode is consistent with the processing manner of stage two in the first embodiment, thus the details are not described here. The complete control flow diagram of this embodiment is shown in FIG. 20. When the dimming current signal $I_{dim}$ is higher than or equal to the first current threshold $I_{th1}$, the peak current reference $I_{comp}$ is calculated according to the dimming current signal $I_{dim}$. When the zero-crossing signal (the zero-crossing point of the inductor current) is detected, the switch is controlled to turn on. When the current sampling signal is equal to $I_{comp}$, the comparator module is triggered to control the switch to turn off. When the dimming current signal $I_{dim}$ is lower than the first current threshold $I_{th1}$, control is identical with that shown in FIG. 9, and the details are not described here.

Figure 21:
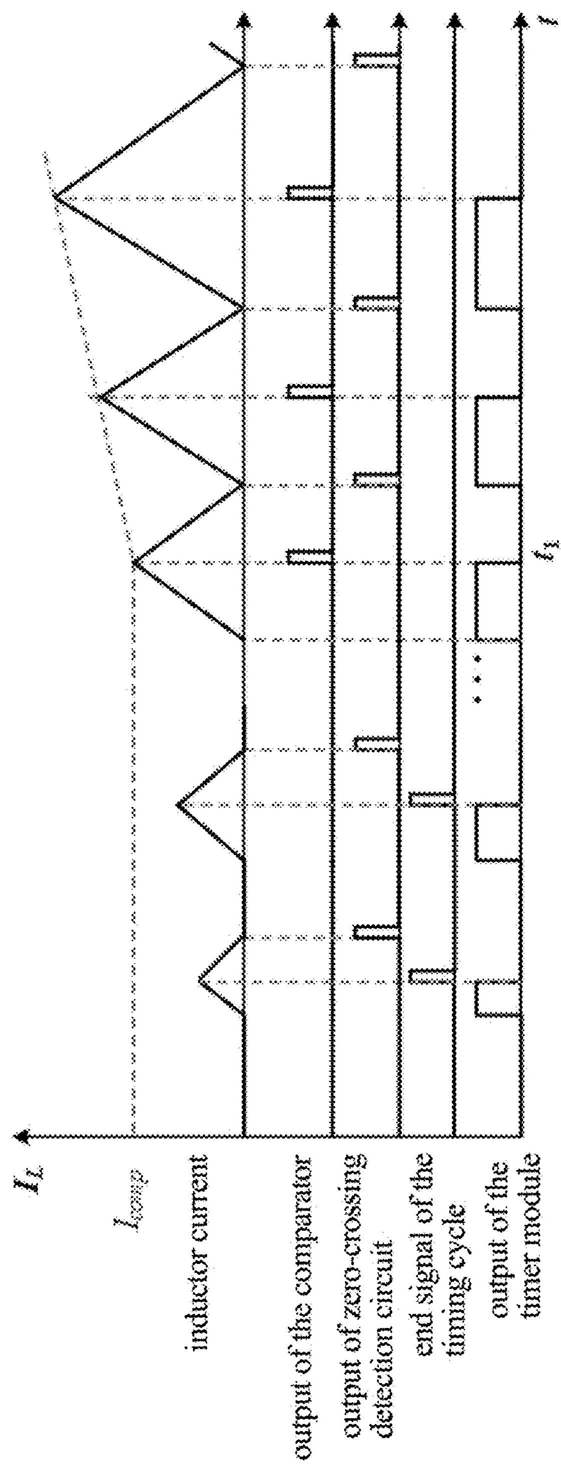
FIG. 21 is a schematic diagram illustrating a switch in a DCM mode and the BCM mode according to the second embodiment of the invention.

Since in the entire dimming range, the circuit operates in two stages, and the inductor current is varied by varying the peak current reference in the BCM mode stage so that the switching frequency varies with the varying peak current reference and thus is not a fixed value. However, constant frequency control is adopted in the DCM mode phase, so the switching between the BCM mode and the DCM mode shall be accurately controlled. A control waveform of switching between modes is shown in FIG. 21. At the time $t_1$, the peak current reference $I_{comp}$ is fixed to a reference value corresponding to the first current threshold $I_{th1}$. Before the time $t_1$, as a cycle of PWM increases gradually, the output current increases gradually. At the time $t_1$, a cycle of the zero-crossing detection signal is equal to the cycle of PWM in the DCM mode stage, and the comparator module starts operating. Then, the Buck circuit operates in the BCM mode, and peak current control is performed according to the control manner of the BCM mode. When the comparator is triggered, the output of the timer module is changed to a low level. When the zero-crossing signal is detected, the output is a high level.

Figure 22:
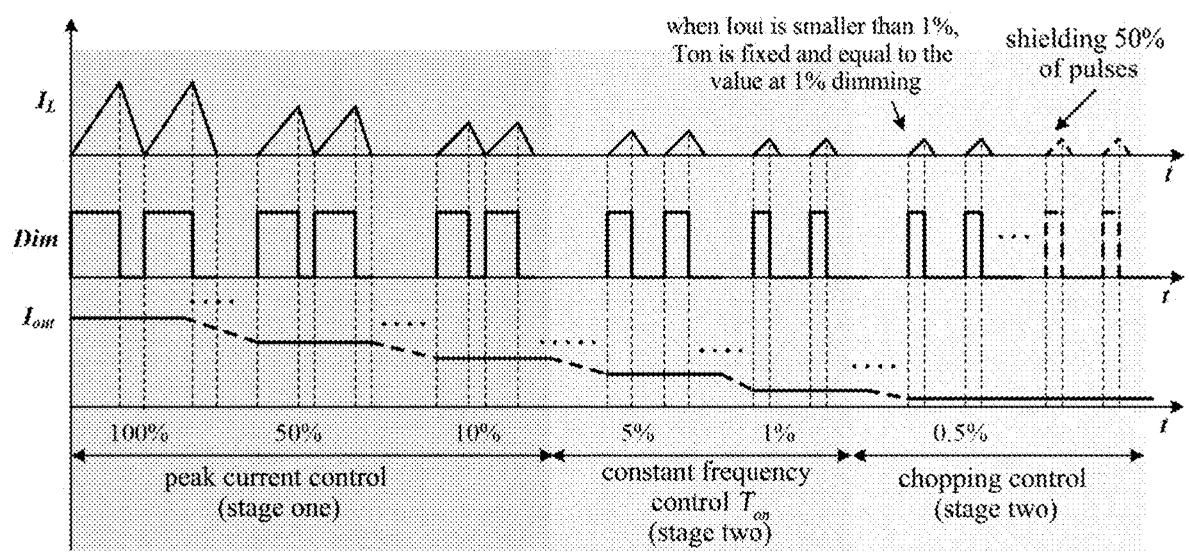
FIG. 22 is a schematic diagram illustrating control within a full current range according to the second embodiment of the invention.

A schematic diagram illustrating the control waveforms of the inductor current and the output current within the full load range is shown in FIG. 22. The power conversion unit 10 is controlled to operate in the BCM mode in stage one and peak current control may be adopted. The power conversion unit 10 is controlled to operate in the DCM mode in stage two, and constant frequency control and chopping control may be adopted in the DCM mode.

The conventional control schema may operate in the DCM mode only, are suitable for applications with a high output voltage and a low output current, and are relatively complicated in over-current protection. Being directed to these shortcomings, the invention provides a dimming circuit and a control method thereof, which may greatly expand a dimming range, and may realize over-current protection conveniently while ensuring a high dimming accuracy by controlling a LED driving power to operate in different modes according to the output current.

The invention controls the LED driving power to operate in the CCM mode or the BCM mode by the means of peak current control when the output current is high. Since the comparator (MCU internal comparison may be used without additional circuits) is required in peak current control, over-current protection may be realized conveniently. Moreover, the circuit may operate in the DCM mode and the chopping mode when the output current is small. Through combination of control modes, dimming with high accuracy and a wide range can be realized.

Exemplary embodiments of the invention have been shown and described above. It shall be understood that the invention is not limited to the disclosed embodiments. Instead, the invention intends to cover various modifications and equivalent settings included in the spirit and scope of the appended claims.

What is claimed is:

1. A dimming control method applied to a dimming circuit for controlling the brightness of a light emitting diode, the dimming circuit comprising a power conversion unit having an input end, an output end, an inductor, and a switch, the power conversion unit receiving an input voltage from the input end, and converting the input voltage into an output voltage output from the output end by operation of the switch, wherein the dimming control method comprises:

generating an input voltage sampling signal by detecting the input voltage of the power conversion unit;

generating an output voltage sampling signal by detecting the output voltage of the power conversion unit;

generating a current sampling signal by detecting a current flowing through the switch in the power conversion unit;

receiving a dimming signal to calculate and generate a dimming current signal; and outputting a control signal to a driving circuit to drive and control the switch to turn on or turn off according to the input voltage sampling signal, the output voltage sampling signal, the current sampling signal, and the dimming current signal; wherein, the dimming current signal is compared with a first current threshold and a second current threshold, when the dimming current signal is higher than or equal to the first current threshold, the switch is controlled such that the power conversion unit operates in a continuous conduction mode or a boundary conduction mode;

when the dimming current signal is lower than the first current threshold, the switch is controlled such that the power conversion unit operates in a discontinuous conduction mode, wherein when the dimming current signal is lower than the second current threshold, the switch is controlled such that the power conversion unit operates in a chopping control mode.

2. The dimming control method according to claim 1, comprising:

setting a peak current reference according to the dimming current signal;

comparing the current sampling signal with the peak current reference, and controlling the switch to be switched from an on state to an off state when the current sampling signal is equal to the peak current reference.

3. The dimming control method according to claim 2, comprising:

setting a ripple current reference, and calculating an off time of the switch according to the output voltage sampling signal, the ripple current reference, and an inductance of the inductor;

controlling the switch to be switched from the off state to the on state after the off time, such that the power conversion unit operates in the continuous conduction mode.

4. The dimming control method according to claim 3, wherein the off time of the switch is calculated by the following formula:

$$T_{off} = I_{pp} \cdot \frac{L}{V_{out}};$$

wherein $T_{off}$ is an off time of the switch, $V_{out}$ is the output voltage, $I_{pp}$ is the ripple current reference, and L is the inductance of the inductor.

5. The dimming control method according to claim 4, wherein the ripple current reference is equal to a corresponding peak current reference when the dimming current signal is equal to the first current threshold.

6. The dimming control method according to claim 3, further comprising:

setting a fixed switching period when the dimming current signal is higher than or equal to the second current threshold and lower than the first current threshold; and calculating an on time of the switch according to the input voltage sampling signal, the output voltage sampling signal, the dimming current signal, and the inductance of the inductor, and adjusting an output current by adjusting a duty cycle of the control signal, thereby controlling the switch to make the power conversion unit to operate in a constant frequency discontinuous conduction mode.

7. The dimming control method according to claim 6, wherein, the on time of the switch is calculated by the following formula:

$$T_{on} = \sqrt{\frac{2 \cdot L \cdot V_{out} \cdot I_{dim}}{f_s \cdot V_{in} \cdot (V_{in} - V_{out})}};$$

wherein $T_{on}$ is the on time of the switch, L is the inductance of the inductor, $V_{in}$ is the input voltage, $V_{out}$ is the output voltage, $I_{dim}$ is the dimming current signal, and $f_g$ is a switching frequency of the switch.

8. The dimming control method according to claim 6, further comprising:

when the dimming current signal is lower than the second current threshold, setting the duty cycle of the control signal to be fixed, and adjusting the number of pulses of the control signal by chopping to adjust the output current, thereby controlling the switch to make the power conversion unit to operate in the chopping control mode; and in the chopping control mode, the duty cycle of the control signal is fixed to a corresponding duty cycle when the dimming current signal is equal to the second current threshold.

9. The dimming control method according to claim 3, further comprising:

when the dimming current signal is higher than or equal to a third current threshold and lower than the first current threshold, calculating a switching period of the switch according to the input voltage sampling signal, the output voltage sampling signal, the dimming current signal, and the ripple current reference;

calculating an on time of the switch according to the input voltage sampling signal, the output voltage sampling signal and the ripple current reference;

adjusting an output current according to the switching period and the on time, thereby controlling the switch to make the power conversion unit to operate in a variable frequency discontinuous conduction mode.

10. The dimming control method according to claim 9, wherein, the switching period of the switch is calculated by the following formula:

$$T_s = \frac{I_{pp}^2 \cdot L \cdot V_{in}}{2 \cdot I_{dim} \cdot V_{out} \cdot (V_{in} - V_{out})};$$

wherein $T_s$ is the switching period of the switch, $I_{pp}$ is the ripple current reference, L is the inductance of the inductor, $V_{in}$ is the input voltage, $I_{dim}$ is the dimming current signal, and $V_{out}$ is the output voltage; and the on time of the switch is calculated by the following formula:

$$T_{on} = I_{pp} \cdot \frac{L}{V_{in} - V_{out}};$$

wherein $T_{on}$ is the on time of the switch, $I_{pp}$ is the ripple current reference, and L is the inductance of the inductor.

11. The dimming control method according to claim 9, further comprising:

setting the switching period to be fixed when the dimming current signal is higher than or equal to the second current threshold and lower than the third current threshold; and calculating the on time of the switch according to the input voltage sampling signal, the output voltage sampling signal, and the dimming current signal, and adjusting the output current by adjusting a duty cycle of the control signal, thereby controlling the switch to make the power conversion unit to operate in a constant frequency discontinuous conduction mode.

12. The dimming control method according to claim 11, wherein, the on time of the switch is calculated by the following formula:

$$T_{on} = \sqrt{\frac{2 \cdot L \cdot V_{out} \cdot I_{dim}}{f_s \cdot V_{in} \cdot (V_{in} - V_{out})}};$$

wherein $T_{on}$ is the on time of the switch, L is the inductance of the inductor, $V_{in}$ is the input voltage, $V_{out}$ is the output voltage, $I_{dim}$ is the dimming current signal, and $f_g$ is a switching frequency of the switch.

13. The dimming control method according to claim 11, further comprising:

when the dimming current signal is lower than the second current threshold, setting the duty cycle of the control signal to be fixed, and adjusting the number of pulses of the control signal by chopping to adjust the output current, thereby controlling the switch to make the power conversion unit to operate in the chopping control mode; and in the chopping control mode, the duty cycle of the control signal is fixed to a corresponding duty cycle when the dimming current signal is equal to the second current threshold.

14. The dimming control method according to claim 9, wherein in the discontinuous conduction mode, the peak current reference is fixed to a corresponding peak current reference when the dimming current signal is equal to the first current threshold.

15. The dimming control method according to claim 2, further comprising:

generating a zero-crossing detecting signal by detecting a current on the inductor of the power conversion unit, and when a zero-crossing point of the current is detected, controlling the switch to be switched from the off state to the on state, such that the power conversion unit operates in the boundary conduction mode.

16. The dimming control method according to claim 15, further comprising:

setting a switching period of the switch to be fixed when the dimming current signal is higher than or equal to the second current threshold and lower than the first current threshold; and calculating an on time of the switch according to the input voltage sampling signal, the output voltage sampling signal, the dimming current signal, and an inductance of the inductor, and adjusting an output current by adjusting a duty cycle of the control signal, thereby controlling the switch to make the power conversion unit to operate in the discontinuous conduction mode.

17. The dimming control method according to claim 16, wherein, the on time of the switch is calculated by the following formula:

$$T_{on} = \sqrt{\frac{2 \cdot L \cdot V_{out} \cdot I_{dim}}{f_s \cdot V_{in} \cdot (V_{in} - V_{out})}};$$

wherein $T_{on}$ is the on time of the switch, L is the inductance of the inductor, $V_{in}$ is the input voltage, $V_{out}$ is the output voltage, $I_{dim}$ is the dimming current signal, and $f_g$ is a switching frequency of the switch.

18. The dimming control method according to claim 16, further comprising:

when the dimming current signal is lower than the second current threshold, setting the duty cycle of the control signal to be fixed, and adjusting the number of pulses of the control signal by chopping to adjust the output current, thereby controlling the switch to make the power conversion unit to operate in the chopping control mode.

19. The dimming control method according to claim 18, wherein in the chopping control mode, the duty cycle of the control signal is fixed to a corresponding duty cycle when the dimming current signal is equal to the second current threshold.

* * * * *